(12) United States Patent
Bylsma et al.

(10) Patent No.: US 7,478,607 B2
(45) Date of Patent: Jan. 20, 2009

(54) THREE-DIMENSIONAL CAMOUFLAGE FABRIC AND METHOD FOR MAKING SAME

(76) Inventors: Jay M Bylsma, 17262 Berkshire, Grand Haven, MI (US) 49417; Paul E Takken, 24 Ida Red, Sparta, MI (US) 49345

( * ) Notice: Subject to any disclaimer, the term of this patent is extended or adjusted under 35 U.S.C. 154(b) by 98 days.

(21) Appl. No.: 11/615,314

(22) Filed: Dec. 22, 2006

(65) Prior Publication Data

US 2007/0218253 A1  Sep. 20, 2007

Related U.S. Application Data

(60) Provisional application No. 60/752,853, filed on Dec. 22, 2005.

(51) Int. Cl.
*D05B 35/08* (2006.01)
*A41G 1/00* (2006.01)

(52) U.S. Cl. ............... 112/475.08; 112/152; 428/17; 428/919

(58) Field of Classification Search ............... 112/117, 112/475.08, 152, 470.33, 307; 156/61, 85, 156/93, 268, 84; 428/102, 919, 17, 15; 2/244, 2/900, 94

See application file for complete search history.

(56) References Cited

U.S. PATENT DOCUMENTS

| | | | | |
|---|---|---|---|---|
| 5,695,835 A | * | 12/1997 | Weber et al. | 428/17 |
| D393,950 S | * | 5/1998 | Lockhart | D5/64 |
| 6,460,185 B1 | * | 10/2002 | Hardy | 2/69 |
| 6,499,141 B1 | | 12/2002 | Egnew | |
| 6,754,910 B2 | * | 6/2004 | Shultz et al. | 2/244 |
| 6,910,223 B2 | * | 6/2005 | Egnew | 2/69 |

* cited by examiner

*Primary Examiner*—Ismael Izaguirre
(74) *Attorney, Agent, or Firm*—Jonathan A. Bay

(57) ABSTRACT

A camouflage material comprises a plurality of parallel strips of camouflage fabric attached side by side laterally across a substrate and extending longitudinally along the substrate. The strips have a plurality of longitudinally spaced edge strips extending laterally from side edges of a central portion. The edge strips have a flat body that extends outwardly from the central portion to an outer end. The edge strips are formed so that at lest some of the edge strips deflect outwardly and downwardly to give the fabric a three-dimensional contour. The three-dimensional effect is achieved by employing enlarged bulbous ends on some edge strips or by orienting the edge strips at an upward inclined angle, or both.

6 Claims, 10 Drawing Sheets

THREE-DIMENSIONAL CAMOUFLAGE FABRIC AND METHOD FOR MAKING SAME

CROSS-REFERENCES TO RELATED APPLICATIONS

This application is based on and claims the filing date of Applicant's co-pending U.S. Provisional Patent Application No. 60/752,853, filed Dec. 22, 2005, which is incorporated herein by reference.

STATEMENT REGARDING FEDERALLY SPONSORED RESEARCH OR DEVELOPMENT

Not Applicable.

BACKGROUND OF THE INVENTION

The present invention relates to an improved three-dimensional fabric for use in the manufacture of camouflage garments and a method for making same. In particular, the present invention relates to a three-dimensional camouflage fabric employing edge strips that naturally assume a three-dimensional contour.

DESCRIPTION OF RELATED ART

Camouflage fabrics are well known and are used in garments worn by hunters as well as armed forces personnel for purposes of concealment. Such fabrics are sometimes used for decorative purposes.

One known type of camouflage material is produced by stitching a sheet of camouflage fabric to a sheet of substrate material in a "quilting" fashion, wherein the sheets are stitched together by parallel spaced rows of stitches. The camouflage layer is then cut into strips having irregular, leafy edges between the rows of stitches. A problem with this type of product is that the outer layer tends to lie flat against the substrate, unless the fabric is bent around body parts when the garment is worn.

A number of efforts have been made to improve the three-dimensional effect of camouflage garments. One method is to mechanically form wrinkles in the camouflage fabric at the time it is stitched to the substrate. One such process is described in applicant's co-pending Patent Application No. 60/720,312, filed Sep. 23, 2005, which is incorporated by reference.

Another method for providing a three-dimensional contour to camouflage material is to employ a thermoplastic camouflage fabric and to heat the camouflage fabric at least at discreet locations, so as to produce heat induced deformations in the camouflage layer. One such method for producing three-dimensional camouflage material by heat deformation is shown in applicant's co-pending Patent Application Ser. No. 60/720,059, filed Sep. 23, 2005, which is incorporated by reference.

An object of the present invention is to provide an improved camouflage material, wherein a three-dimensional contour is achieved without a special manufacturing operation in attaching the camouflage fabric to the substrate or in deforming the camouflage fabric.

As used herein, the expression "camouflage material" is intended generally to apply to the composite multi-layer material. The term "fabric" may be used to refer to the camouflage or substrate layers of the composite material, with the understanding that such layers may be formed by sheet materials that do not necessarily come within the technical definition of fabric. The preferred embodiments however are technical fabrics.

DETAILED DESCRIPTION OF THE INVENTION

Figure 3:
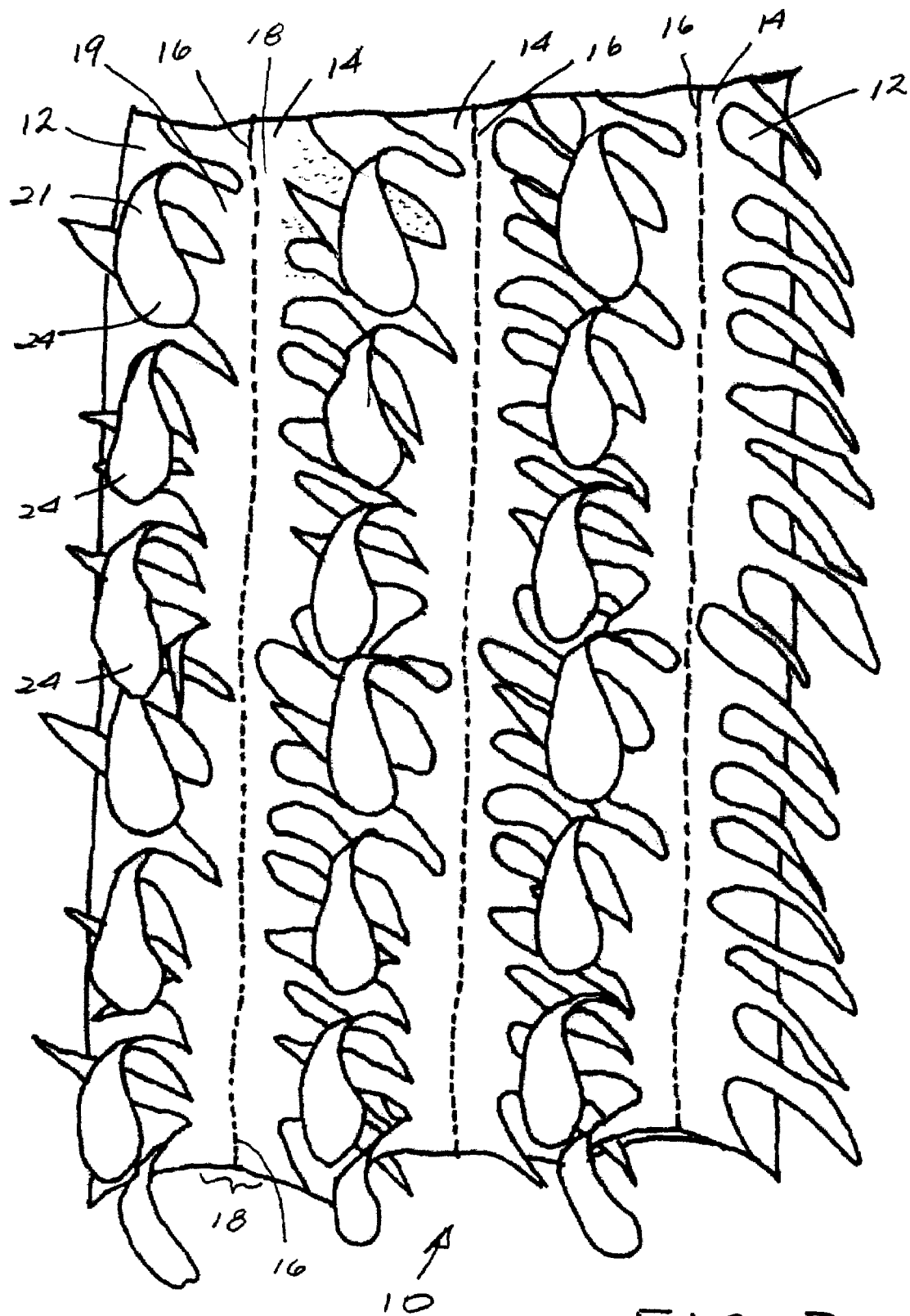
FIG. 3 is a front elevational view of a vertically oriented section of camouflage material produced in accordance with the present invention.
Figure 6:
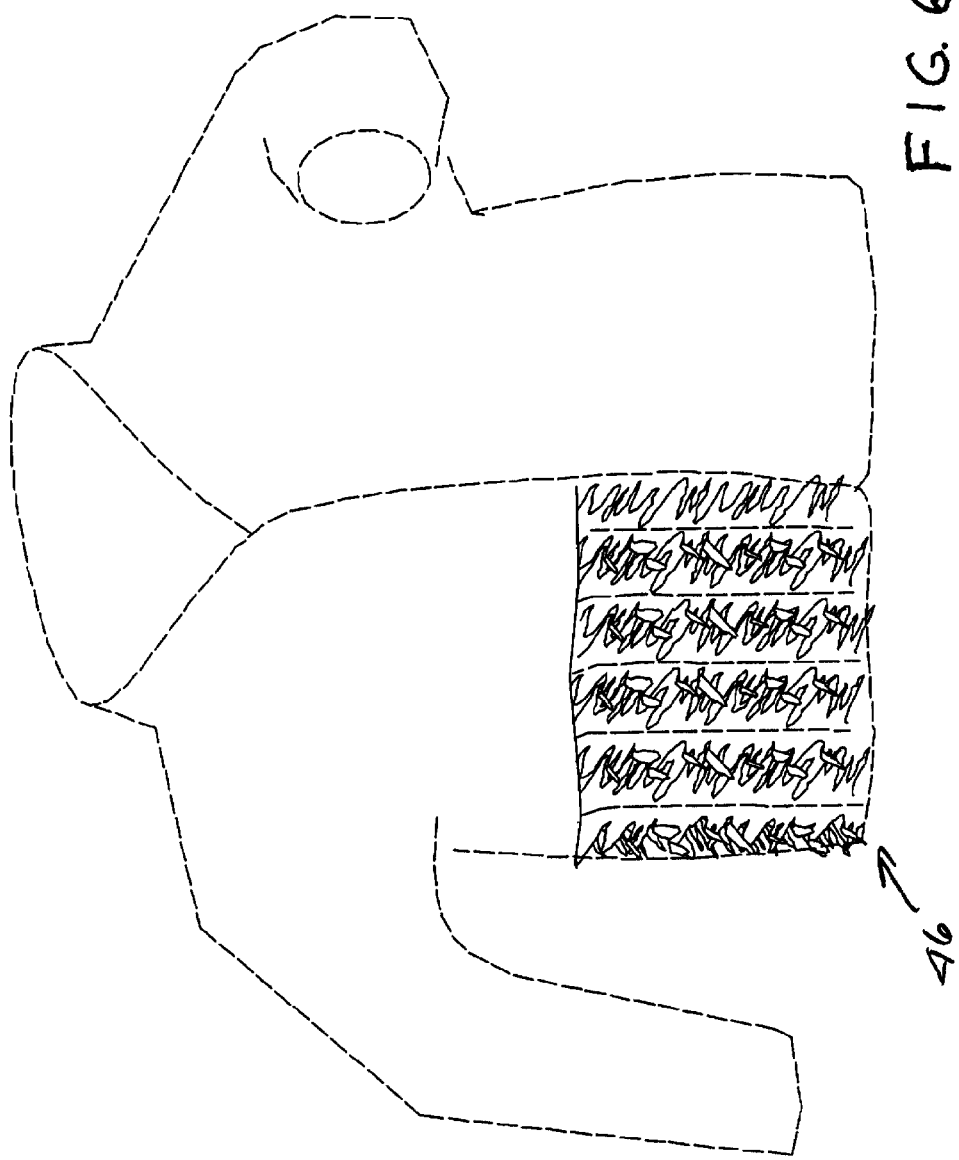
FIG. 6 is a perspective view of a garment constructed with a three-dimensional fabric employing the fabric strip configuration shown in FIGS. 2 and 3.

Referring now to the drawings, an exemplary section of camouflage material 10 constructed in accordance with the present invention and oriented vertically is shown in FIG. 3. Camouflage material 10 comprises a substrate material 12 to which a series of parallel strips 14 of camouflage fabric are attached by means of parallel spaced rows of stitches 16 or other bonding process. Desirably, the camouflage material is fabricated in a quilting machine or similar apparatus where a number of spaced strips of camouflage fabric mounted on continuous reels are attached side by side to a continuous web of a substrate material. Garments (such as jacket 21 in FIG. 6) are subsequently fabricated from the material, with the material being oriented with the strips positioned vertically on vertical surfaces.

The material from which the present camouflage material is made can be conventional. The substrate material typically is a mesh or woven fabric and can include waterproofing or scent blocking material. Some substrate materials (e.g., waterproof and scent blocking materials) have a relatively low melting point and thus are sensitive to the use of some heat processes for producing a three-dimensional configuration to the camouflage layer.

The camouflage layer is formed by a plurality of strips of typically preprinted camouflage fabric. A pongee polyester material is commonly employed but is not required in the present invention. This material is a lightweight woven synthetic fabric. Such material is flexible but has sufficient stiffness that lobes formed on irregular side edges tend to be maintained in a flat orientation even when the sheet is positioned vertically, at least when lobe configurations of the type previously used are employed. In previous lobe configurations, the lobes tended to have a wide base adjacent to a central portion that is attached to the substrate, and the lobes would become irregularly narrower as they extended outwardly from the base. With a base as wide or wider than the outer tip, the lobes tended to remain flat against the substrate, unless mechanically or heat deformed.

In the camouflage material 10 of the present invention, the individual strips of camouflage fabric 14 comprise a narrow central portion 18 that is attached by stitches 16 to an underlying substrate 12. Relatively long and narrow edge strips 20 extend laterally outwardly from outer edges of the central portion. The edge strips can vary in width and length to form an irregular and natural appearing pattern in order to produce a natural-appearing random effect. Each edge strip 20 is a generally laterally extending strip of material having a body 21 that extends from a base 19 attached to central portion 18 to an outer tip or end 22.

An important feature of the edge strips of the present invention is that they are narrow enough at least some portions and are long enough that at least certain of the edge strips tend to deform under the influence of gravity out of their flat or planar configuration and bend in an arc downwardly and away from the substrate material. The edge strips thus tend to naturally deform under the influence of gravity into a three-dimensional configuration. Because the edge strips are mounted on the outer side of the substrate, the deformation of the ends or the edge strips is confined to an outward direction, away from the substrate. The edge strips are wide enough and resilient enough that they fold out in an arc and do not simply fold over flat.

The deformation of the edge strips into a three-dimensional arcuate configuration is enhanced by forming the edge strips with bulbous or enlarged ends 24 at various positions along the strips 14 of camouflage fabric. The bulbous ends provide wider edge strip width and therefore increased weight at the outer tip of the edge strips, which causes the edge strips to twist outwardly and deflect downwardly. The body and outer tip of the edge strip thus curves arcuately away from the base, giving the fabric a three-dimensional contour.

It is not necessary for every edge strip in the strip to be configured so as to be easily deformable into a three-dimensional configuration. It is sufficient that a large enough number of the edge strips are so configured to give the camouflage material an overall three-dimensional appearance.

Figure 1:
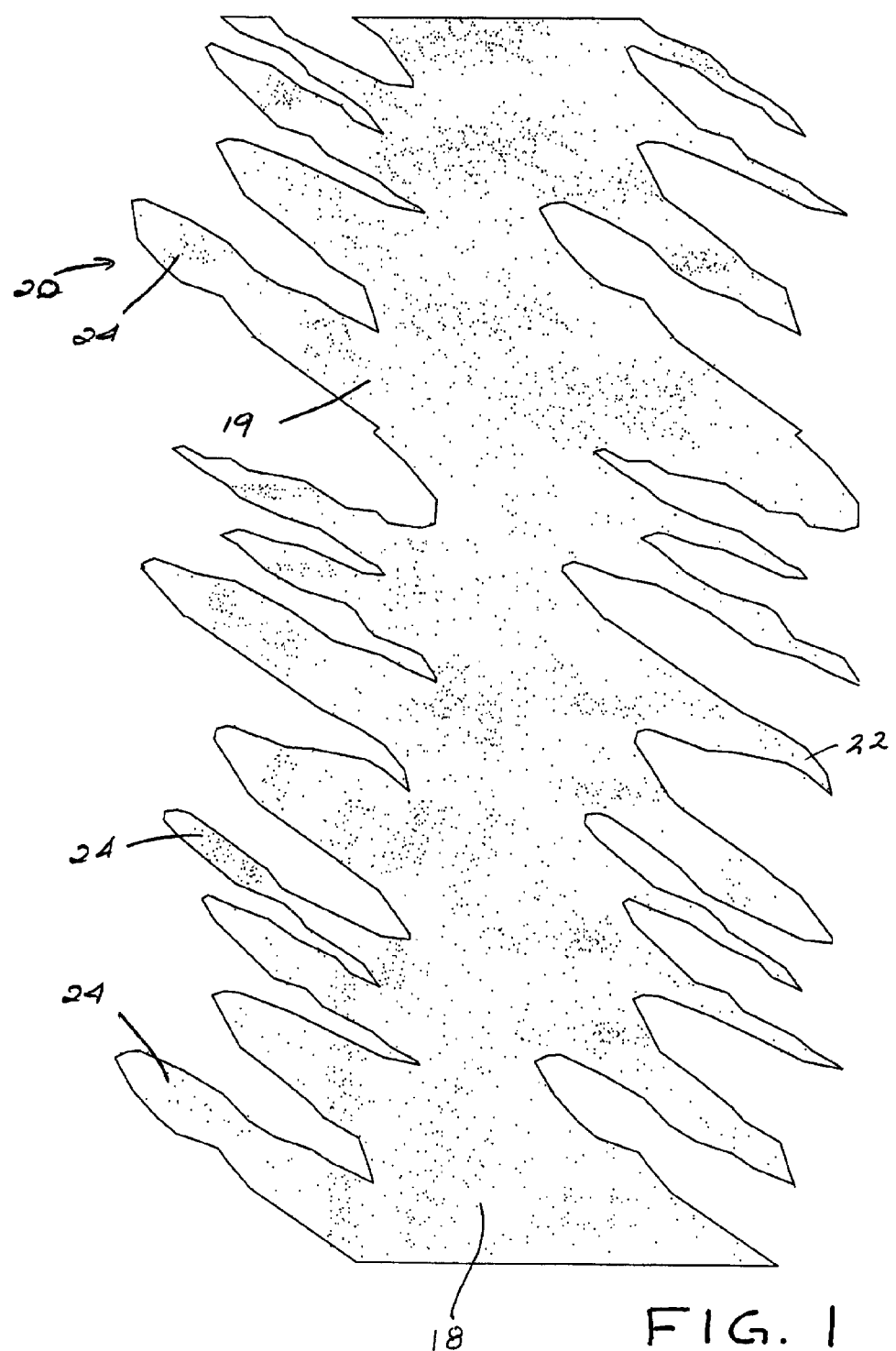
FIG. 1 is a plan view of a strip of camouflage fabric manufactured in accordance with the present invention.
Figure 2:
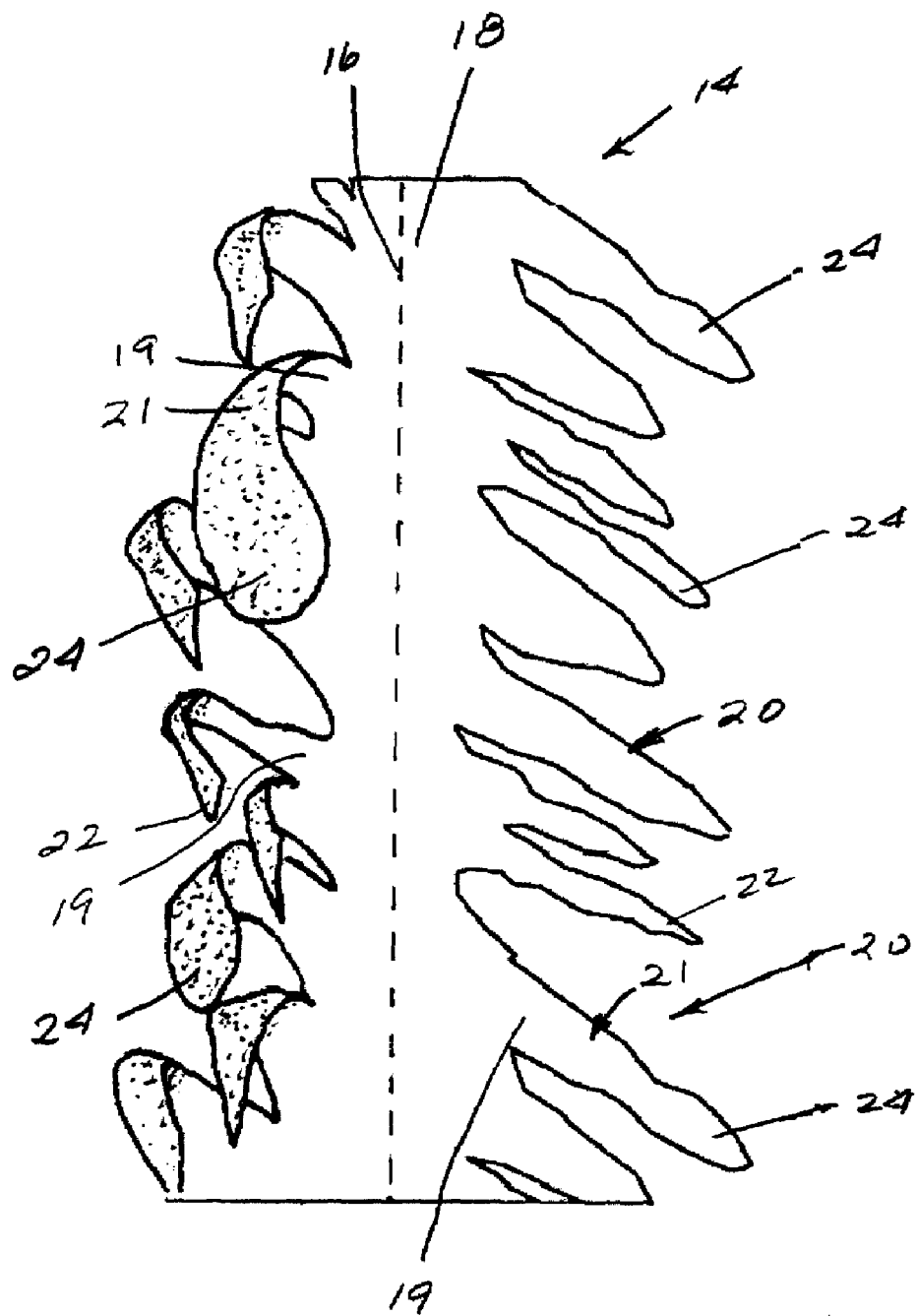
FIG. 2 is a perspective view showing the manner in which the camouflage fabric of FIG. 1 deforms naturally into a three-dimensional configuration when disposed vertically.

Referring to FIG. 1, it can be observed that the edge strips 20 on the left side of the central portion of the camouflage fabric strip are generally inclined in an upward direction from right to left, while the edge strips on the right hand side of the central portion are inclined downwardly from left to right. The upwardly inclined edge strips are more easily deformable into a downward arcuate position than the edge strips on the right hand side, due to the fact that the weight of an upwardly extending edge strip is supported in compression by the flexible body of the edge strip, so the body tends to yield and bend over. On the right hand side, the outer portion of a downwardly extending edge strip is, in effect, hanging from the edge strip and thus does not urge the edge strip to bend over. The edge strips on adjacent strips of camouflage fabric thus tend to interfere with each other on an irregular basis, such that some edge strips deflect outwardly, while other edge strips remain more or less parallel with the substrate and cover the substrate, with outwardly deflecting edge strips urging other strips to deflect in a similar manner. While the angle of inclination of the edge strips can vary and may not be essential when a bulbous end is employed, it is desirable if the edge strips are formed or inclined at an angle such that the end extends above the upper edge of the edge strip where it attaches to the central portion or where the edge strip is intended to bend. This insures that there is a downward bending force on the body of the edge strip.

In the illustrated embodiment, the angle of inclination of the edge strips is about 35° for a substantial number of strips. A larger angle of up to about 45° or so is acceptable. Strips that are not straight but have upwardly extending portions also produce the desired effect. Strips formed at a smaller inclination also can be satisfactory. An inclination of as low as 15° can produce the desired effect, depending on the fabric and its length and width.

The edge strips at the right hand side of the fabric strips do not have to be inclined downwardly, as in the exemplary embodiment, but could also be inclined upwardly, so that the edge strips on both sides of a camouflage fabric strip would bend downwardly.

While the dimensions of the edge strips can vary and still produce the three-dimensional effect of the present invention, when a conventional camouflage fabric is used, one desirable configuration employs naturally deforming edge strips that are at least about two inches long and are no more than about one-half inch wide at the narrower portion intended for deflection. The narrower portion should be long enough to permit the body to twist out and down. Desirably, the edge strips are about five times longer than they are wide. Preferably, the bulbous ends are about one and one-half times the width of the body at its narrower portion, so that the additional mass will be sufficient to induce deflection. All of these dimensions can be varied to produce a desired effect with a particular fabric.

Figure 9:
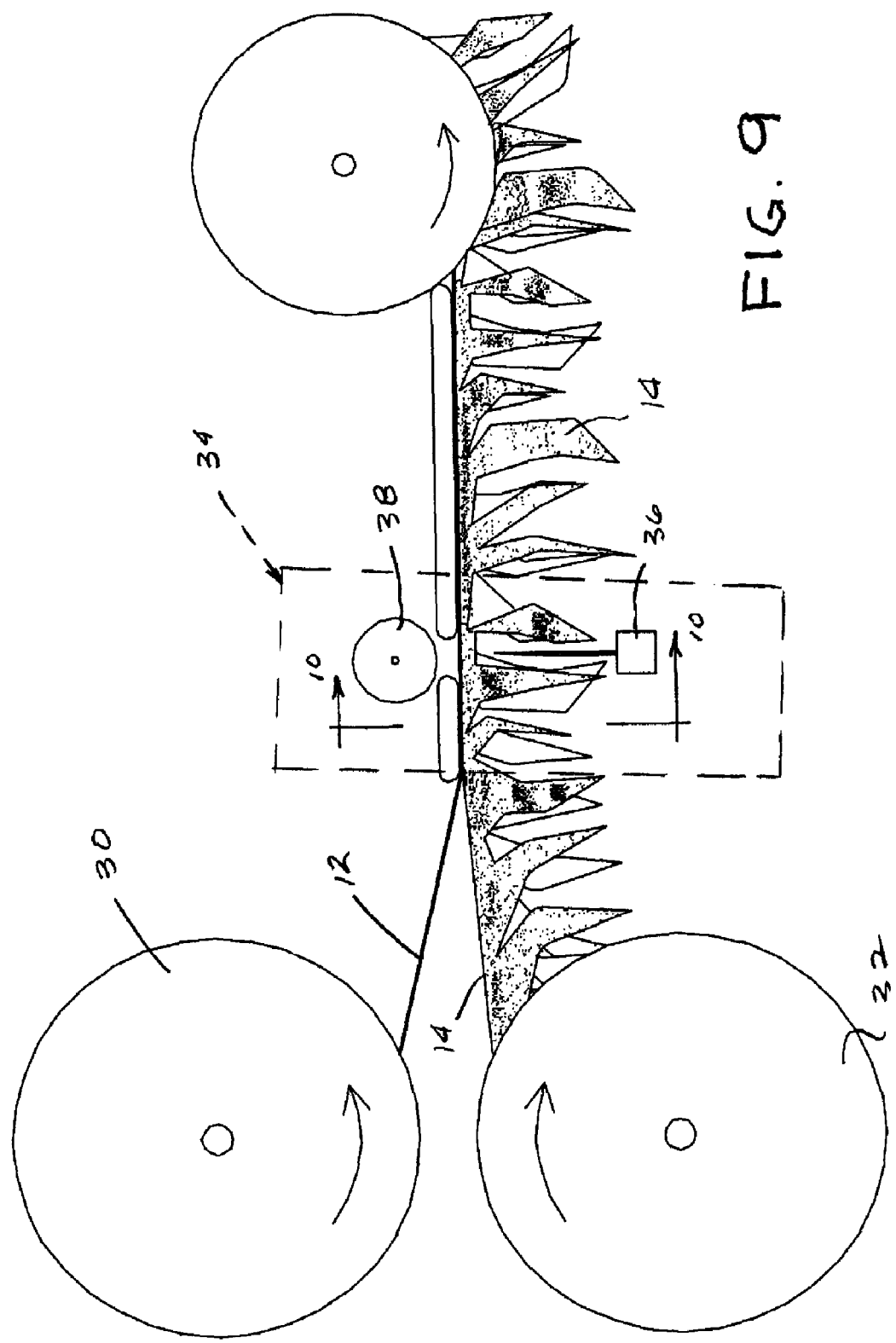
FIG. 9 is a pictorial side view showing the manner in which the camouflage fabric is sewn to a substrate in order to produce the camouflage fabric of the present invention.
Figure 10:
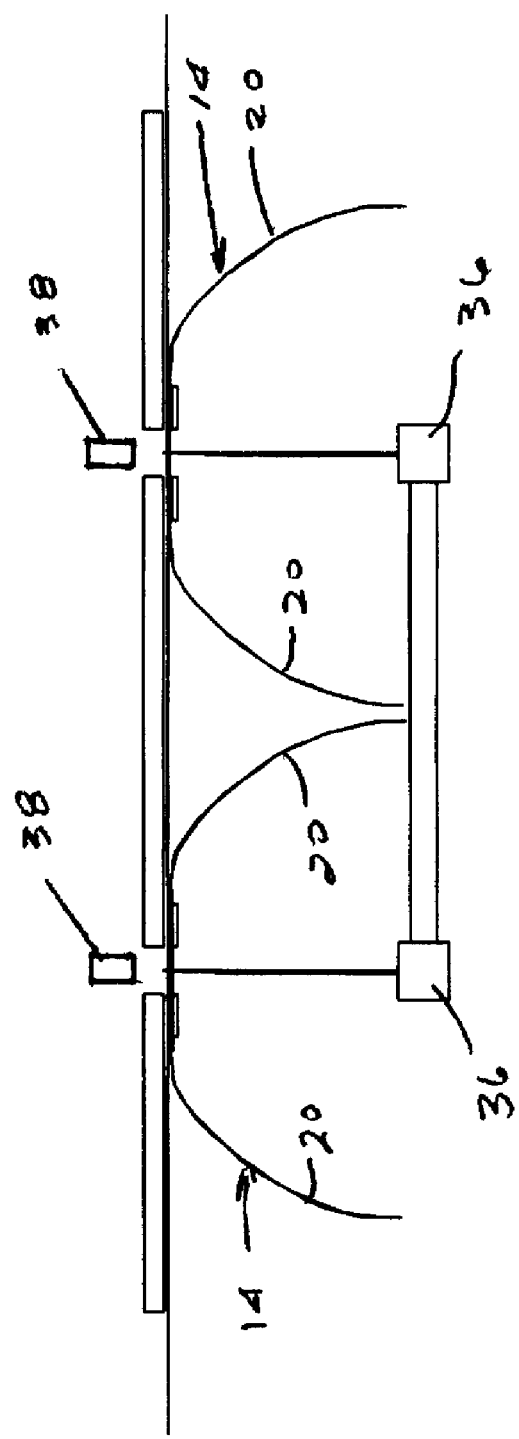
FIG. 10 is a sectional view taken along lines 10-10 of FIG. 9, showing the manner in which the camouflage fabric is attached to the substrate material.

In attaching the camouflage strips to the substrate, a desirable three-dimensional effect is achieved in a camouflage material when the strips of camouflage fabric are separated by parallel rows of stitching approximately three inches apart, with each strip of camouflage fabric being approximately six inches wide or somewhat wider. The closer the strips are together and the longer that the edge strips are, the greater is the three-dimensional effect. However, with a conventional quilting machine, it is difficult to sew two strips of camouflage material together on a substrate when the outer tips of the edge strips extend outwardly beyond the distance between the lines of attachment of the adjacent strips. In such a case, the outer edges of one strip of fabric can be sewn onto the substrate material by the stitching applying the adjacent strip of fabric. To avoid that in the present invention, the sewing process desirably is conducted upside-down, as shown in FIGS. 9 and 10. As shown schematically, a roll of substrate material 30 is positioned above a series of laterally spaced reels of camouflage fabric strips 32. These are fed into a conventional quilting machine 34, which has been modified by positioning the sewing head 36 underneath the material being stitched together, and the bobbin 38 is positioned above the material. The camouflage fabric 14 thus hangs downwardly as shown in FIG. 9, with the outer tips of edge strip 20 hanging downwardly and away from the sewing heads 36. The ends of the edge strips thus hang free and do not interfere with the sewing operation, and only the base or central portion of each strip is sewn to the substrate. With the sewing accomplished in this manner, the adjacent strips of camouflage material can be positioned quite close to each other, so that the strips would otherwise be overlapping.

Figure 7:
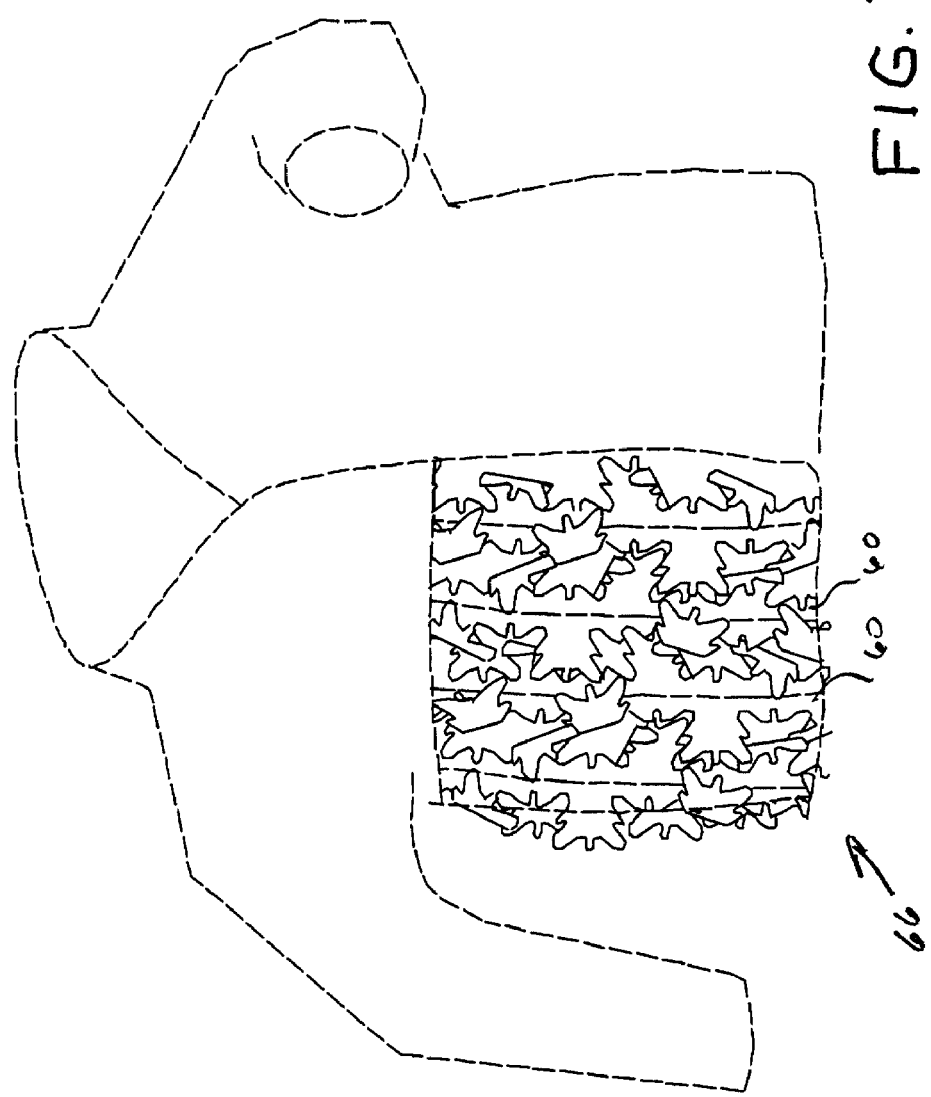
FIG. 7 is a perspective view of a garment constructed with a three-dimensional fabric employing the fabric strip configuration shown in FIG. 4.
Figure 8:
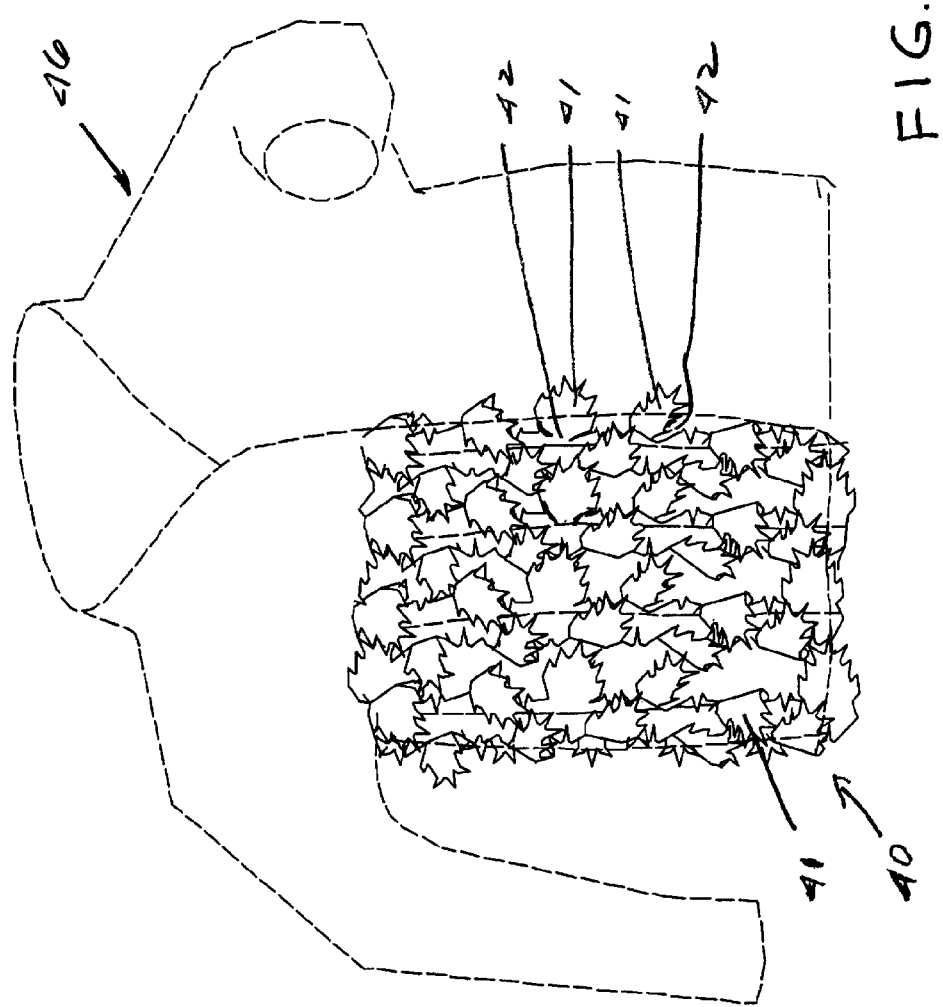
FIG. 8 is a perspective view of a garment constructed with a three-dimensional fabric employing an oak leaf fabric strip configuration.

While the camouflage material of the present invention is desirably formed with some edge strips having bulbous ends formed on the ends of relatively narrower body portions of the edge strips of the camouflage fabric, the exact manner in which this is achieved and the exact number of enlarged bulbous ends is not critical, as long as the overall effect is three-dimensional. Because of this, it is possible to configure the side edges of the strips in a number of ways. For example, oak leaves 40 are shown in the garment 46 of FIG. 8. These have enlarged ends 41 attached to the central portions of the strips by narrower body portions 42. The mass of the ends causes the body to twist and deflect outwardly. Bulbous ends and moth wings are shown in garment 46 and 66 of FIGS. 6 and 7.

Figure 4:
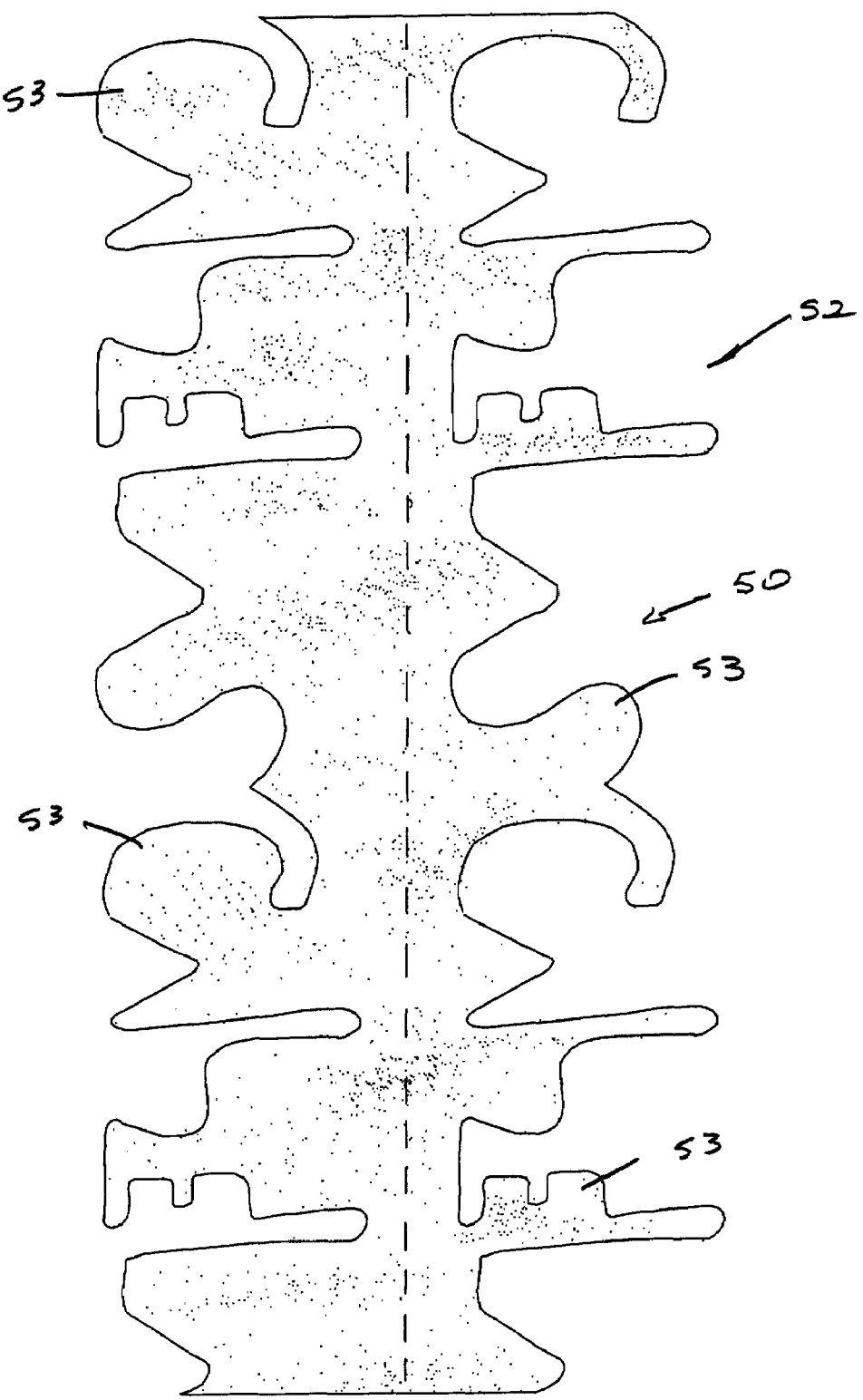
FIG. 4 is a plan view of a second embodiment of a strip of camouflage fabric of the present invention.

The present invention can also be used with unconventional edge designs. For example, camouflage fabric strips 50, shown in FIG. 4, have edges 52 that are configured to display the name or trademark of an advertiser or fabric or garment manufacturer. The edge strips can still be configured so that certain strips 53 are configured to naturally bend over into a three-dimensional configuration.

Figure 5:
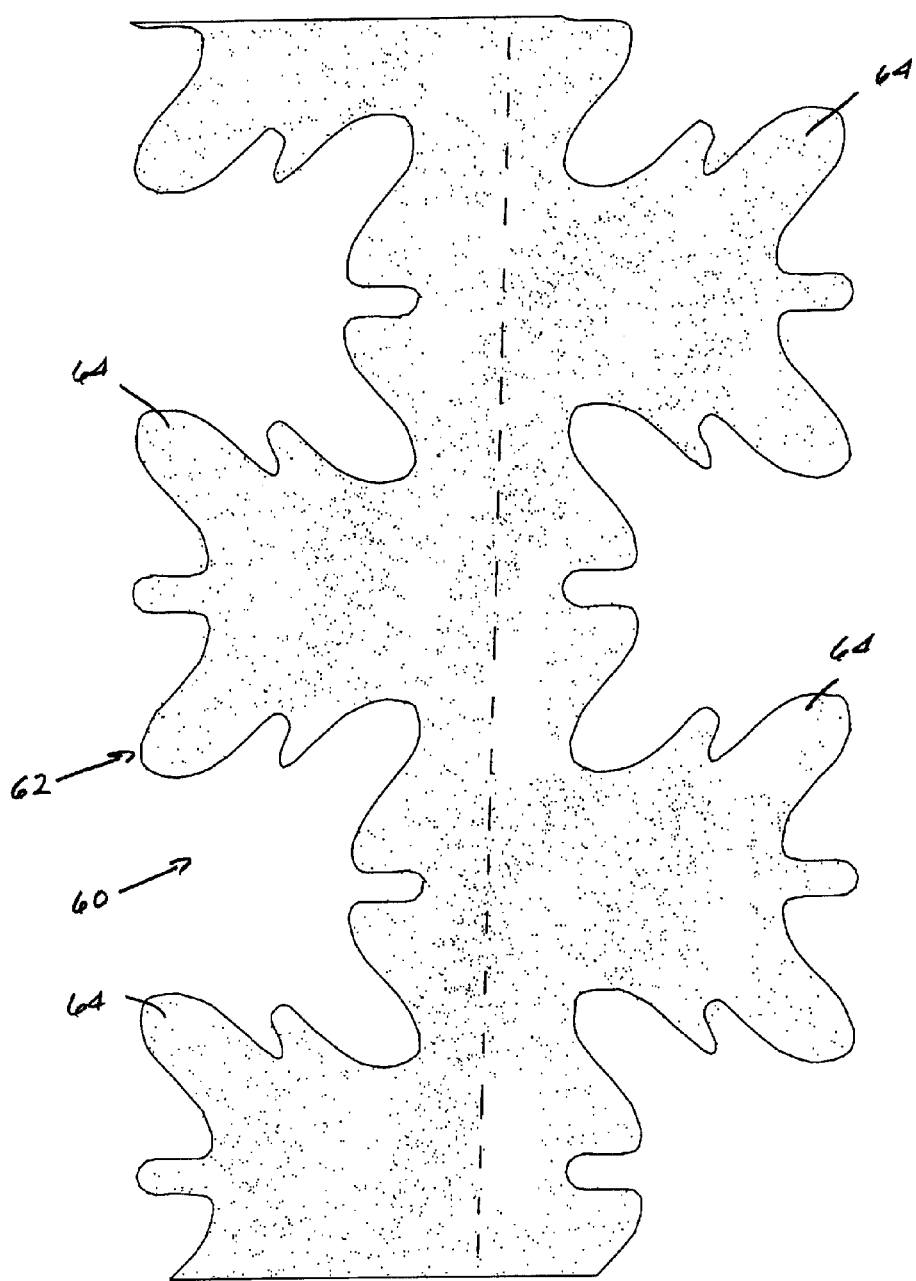
FIG. 5 is a plan view of a strip of camouflage fabric produced in accordance with a third embodiment of the present invention.

The camouflage strips also can be configured to display a repetitive graphic design or logo. As shown in FIG. 5, fabric strip 60 employs edges 62 configured with a moth design. The enlarged outer ends 64 of the edge strips cause the ends of the strips to deflect into a three-dimensional configuration.

The camouflage fabric can be formed into narrow strips from a wider web or roll of fabric by laser cutting, die cutting, or hot wire or hot air cutters. In the preferred practice of the invention, a series of laser cutters mounted on a movable bridge extend transversely over a cutting table, and a wide web of camouflage fabric is passed under the laser cutters, which cut the web into a series of strips. Computer controlled drive units for the fabric and lasers can be programmed to produce the side edge configuration desired.

It should be understood that the foregoing is merely representative of the preferred practice of the present invention, and that various changes in the arrangements and details of construction can be made without departing from the spirit and scope of the present invention.

We claim:

1. A method of sewing camouflage strips to a substrate in parallel rows by spaced lines of attachment that are separated by a distance less than the distance between the line of attachment and the outer side edge end of the attached camouflage strip, comprising sewing the strips on the substrate in an upside down fashion, wherein the camouflage strips are positioned underneath the substrate with the outer ends thereof dropping down, the camouflage strips being sewn to the substrate with upside down sewing heads wherein the sewing heads are positioned below the camouflage material and sew in an upward direction.

2. Apparatus for sewing camouflage strips to a substrate in accordance with the method of claim 1.

3. Three-dimensional camouflage material comprising a substrate and camouflage strips sewn to the substrate in accordance with the method of claim 1.

4. A method of sewing camouflage strips to a substrate in rows by spaced lines of attachment, comprising sewing the strips on the substrate in an upside down fashion, wherein the camouflage strips are positioned underneath the substrate with the outer ends thereof dropping down, the camouflage strips being sewn to the substrate with upside down sewing heads wherein the sewing heads are positioned below the camouflage material and sew in an upward direction.

5. Apparatus for sewing camouflage strips to a substrate in accordance with the method of claim 4.

6. Three-dimensional camouflage material comprising a substrate and camouflage strips sewn to the substrate in accordance with the method of claim 4.

* * * * *